United States Patent
Bobbio (10) Patent No.: US 6,420,814 B1
(45) Date of Patent: *Jul. 16, 2002

(54) SPIRAL WOUND TRANSDUCER

(76) Inventor: Stephen M. Bobbio, 209 Oakcrest Dr., Wake Forest, NC (US) 27587

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,798

(22) Filed: May 18, 1999

(51) Int. Cl.[7] .................................. H02N 1/00
(52) U.S. Cl. ........................................ 310/309
(58) Field of Search ....................... 310/309, 308; 200/181; 322/2 A; 318/116; 324/457

(56) References Cited

U.S. PATENT DOCUMENTS

| | | | | | |
|---|---|---|---|---|---|
| 2,975,307 | A | * | 3/1961 | Schroeder et al. | 310/309 |
| 3,544,733 | A | * | 12/1970 | Reylek et al. | 381/99 |
| 4,620,262 | A | * | 10/1986 | Olsen | 361/323 |
| 4,887,248 | A | * | 12/1989 | Griebeler | 367/181 |
| 5,428,259 | A | * | 6/1995 | Suzuki | 310/309 |
| 5,450,498 | A | * | 9/1995 | Whitehead | 381/191 |
| 5,479,061 | A | * | 12/1995 | Bobbio et al. | 310/309 |

* cited by examiner

Primary Examiner—Nestor Ramirez
Assistant Examiner—Guillermo Perez
(74) Attorney, Agent, or Firm—Lynn E. Barber (57) ABSTRACT

A transducer compressible in response to electric power, including a flexible, conductive plastic layer microimprinted with a pattern and a stiff plastic layer containing a conductive embedded sheet.

16 Claims, 8 Drawing Sheets

PRIOR ART

SPIRAL WOUND TRANSDUCER

CROSS-REFERENCE TO RELATED DOCUMENTS

This invention is disclosed in Disclosure Document No. 419672, filed May 19, 1997 with the US Patent Office.

BACKGROUND OF THE INVENTION

1. Field of the Invention

This invention relates to transducers, and in particular, relates to a spiral wound transducer having an array of metallized plastic capacitive force cells.

2. Description of the Related Art

Transducers are devices which convert one form of input energy to a different form of output energy. Thus, electromechanical transducers may convert electrical energy to mechanical energy, due to the electrostatic attraction caused by two opposing and oppositely charged plates which move together in response to a voltage applied between the plates, converting the input electrical energy to mechanical energy.

Figure 1A:
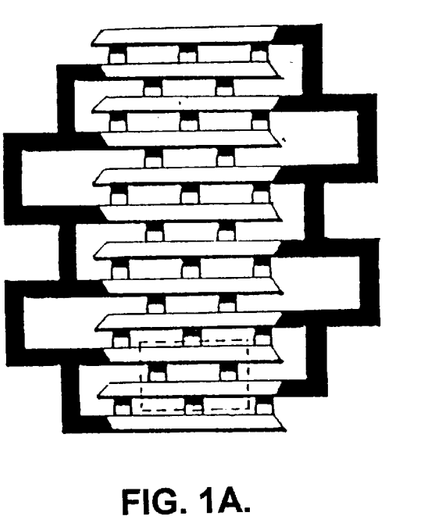
Figure 1B:
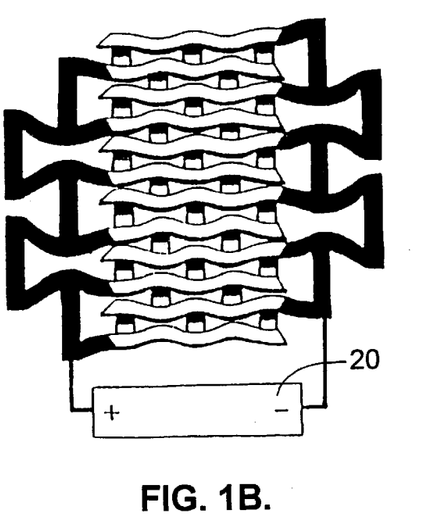
Figures 1C, 1D:
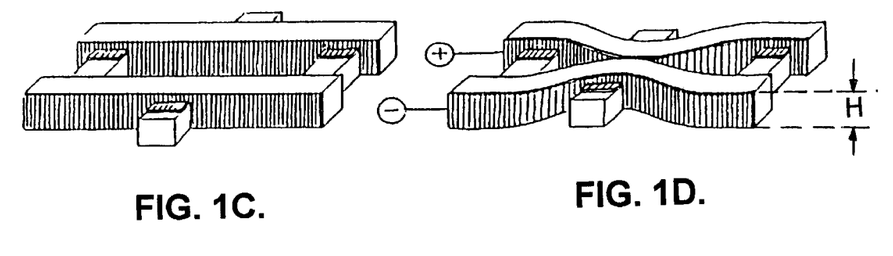
Figure 2A:
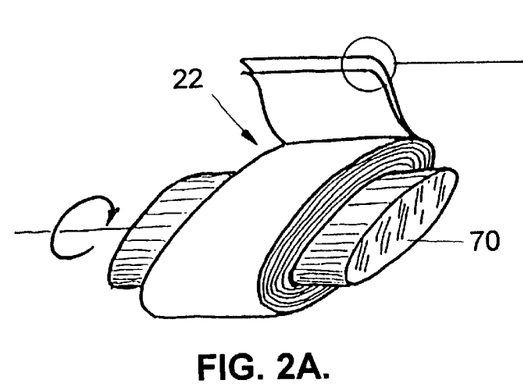
FIG. 2a is a perspective view of an SWT assembly, with a detail thereof being shown in FIG. 2b.
Figure 2B:
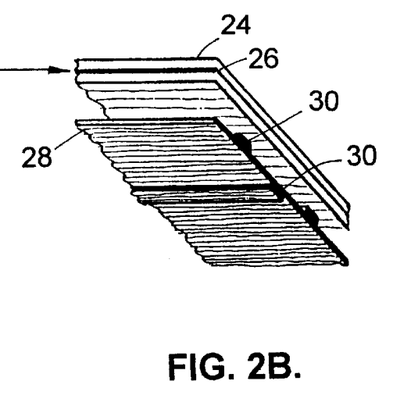
Figure 2C:
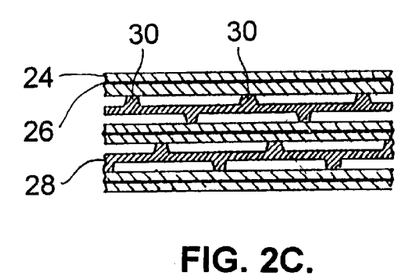
FIG. 2c shows a cross-section of an unpowered, relaxed SWT
Figure 2D:
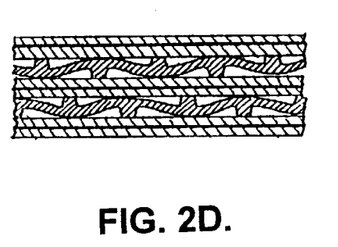
FIG. 2d shows a cross-section of a powered, compressed SWT.

Integrated force arrays (IFAs) are planar, thin film membrane actuators that act as transfer devices for electrostatic force. They are capable of large amplitude motion and are capable of significant work per unit volume. FIG. 1 (a–d) shows the cross-section of a prior art IFA without (FIG. 1a) and with (FIG. 1b) an applied power supply 20, as well as a perspective view of the IFA without (FIG. 1c) and with (FIG. d) an applied power supply. Devices which use IFAs as drivers to scan lead zirconium titanate (PZT) ultrasound acoustic imaging transducers are discussed by Bobbio et al. (Proc. SPIE Conf. on Smart Structures and Materials, 2733:123 (1966)).

Many types of previous transducers consume substantial amounts of electrical power. For example, electromagnetic devices like solenoids consume electrical energy when they are energized but not moving (at a control point of the motion). The IFA device and the spiral wound transducer (SWT) device of the invention consume energy only when they are moving and not at the control points. Further, both the SWT and IFA devices can operate silently and in a muscle-like way where the extent of deformation is controlled in a proportional way by the amount of voltage applied. In the case of the IFA, the height of the capacitor plates (H in FIG. 1d, discussed in more detail below) is limited by the ability to pattern a high aspect ratio feature in a thin plastic film. The aspect ratio of the IFA feature is the ratio to the capacitor gap (1 $\mu$m). Practically, the processing has proven to be limited to an aspect ratio of 2, and thus, H is approximately 2 $\mu$m. In distinction to an IFA, aspect ratio considerations do not limit the dimensions of the capacitor plates in the SWT. The prototypes for the SWT are about 2 mm vs. the IFA's 2 $\mu$m, or a factor of 1000. Since the force is proportional to this dimension, the SWT's are 1000 times stronger.

It is therefore an object of the invention to provide a transducer which, like the IFA, is energy efficient, silent and capable of proportional response, but whose force is not limited by the thickness of the layer being patterned (H in FIG. 1d for the IFA).

Other objects and advantages will be more fully apparent from the following disclosure and appended claims.

SUMMARY OF THE INVENTION

The invention herein is a transducer compressible in response to electric power, comprising a flexible, conductive plastic layer microimprinted with a pattern; and a stiff plastic layer containing a conductive embedded sheet. The transducer may be formed by winding the flexible layer and the stiff layer together around a central form. In some versions of the invention (e.g., as shown in FIGS. 8–11), the flexible and stiff layers may be joined together before winding.

Other objects and features of the inventions will be more fully apparent from the following disclosure and appended claims.

BRIEF DESCRIPTION OF THE DRAWINGS

FIG. 1(a–d) shows the cross-section of a prior art IFA without (FIG. 1a) and with (FIG. 1b) an applied power supply (relaxed and energized positions, respectively), as well as a perspective view of an elementary force cell of the IFA without (FIG. 1c) and with (FIG. 1d) an applied power supply. The heavily shaded regions indicate metal.

FIG. 2(a–d) shows a spiral wound transducer according to the invention.

FIG. 3(a–b) shows a cross-section of a small section of an SWT in an unpowered, relaxed position (FIG. 3a) and in a powered, compressed position (FIG. 3b).

FIG. 4(a–d) shows the very large scale integration (VLSI) process steps for lo forming microimprinted tapes on a silicon wafer.

FIG. 6(a–d) is a series of partial cross-sections showing a patterned resist on a substrate (FIG. 6),the patterned resist flooded exposed with UV light and treated with plasticizer (FIG. 6b), a second substrate placed in contact with the first substrate (FIG. 6c) and assembly being heated and joined (FIG. 6d).

FIG. 7(a–b) shows a modified VLSI fabrication of the microimprinted tape (FIG. 7a) and the stiff tape (FIG. 7b) of the invention wherein additional processing has resulted in a plasticized resist patterned on the stiff and microimprinted tapes.

FIG. 9(a–b) is a cross-section of a portion of an assembled single-tape SWT in the relaxed (unpowered)(FIG. 9a) and compressed (powered)(FIG. 9b). The location where evaporated oxide has been removed is now void, the polyimide layers are shown by dots, and the adhesive layer is shown by diagonal lines slanted opposite of the lines for oxide as shown in the previous figure.

FIG. 10(a–d) is a sequence for forming microimprinted tape using an embossing technique, including exposing metallized microprinted tape with the printed pattern (black ink) and the (colorless) embossing powder on one side to infra red radiation (FIG. 10a), melting the embossing powder is melted in the adjacent areas (FIG. 10b), and liquefying at 100° C., well away from the melting point of MYLAR™ polyester (250° C.) where the unmelted powder has been removed (FIG. 10c).

DETAILED DESCRIPTION OF THE INVENTION AND PREFERRED EMBODIMENTS THEREOF

The present invention provides a spiral wound transducer (SWT) of the invention is an array of metallized plastic capacitive force cells prepared by assembly and treatment of flexible and stiff layers. The cells compress when the device is electrically powered to produce an overall deformation.

Referring to the figures, a first embodiment of the invention is shown in FIG. 2 (a–d). FIG. 2a is a perspective view of an SWT assembly 22, with a detail thereof being shown in FIG. 2b. FIG. 2c shows a cross-section of an unpowered, relaxed SWT and FIG. 2d shows a cross-section of a powered, compressed SWT. The transducer as shown comprises a double plastic layer in the form of two continuous shapes wound on a central form 70B1. This form may be either conductive or insulating. It typically remains in place and may be used to electrically and/or mechanically attach the transducer to an external system. One of the plastic layers 24 is stiff and contains a conductive embedded sheet 26. The stiff layer 24 is an insulated conductor (e.g., metallized polyimide overcoated with a second polyimide layer). The second layer 28 is flexible and is microprinted with a tread-like pattern 30. The flexible layer 28 is also conductive, and is preferably made of conductive plastic or non-conductive plastic with a thin metal coating 32 (e.g., metallized polyimide). A metallized polyimide with the thin metal coating 32 is shown in FIG. 3. The tapes may be electrically connected either through the central winding form and/or on the periphery of the completed device. The pattern on the flexible layer 28 is depicted as two parallel arrays of treads where the top array is offset by half the tread spacing from the bottom array. Other patterns will also serve and two examples include: a pattern in which each of the treads 30 is broken up into a linear pattern of bumps, or a checkerboard pattern with the top array consisting of bumps in the centers of the 'red squares' and the bottom array consisting as bumps in the centers of the 'black squares'. What is essential is that there be a section along some line through the microimprinted tape which resembles the structure in FIG. 2c. The lapped two-course structure 22 stabilizes the modes of compression as well as obviating any need to align successive windings of the double layers.

Figure 3A:
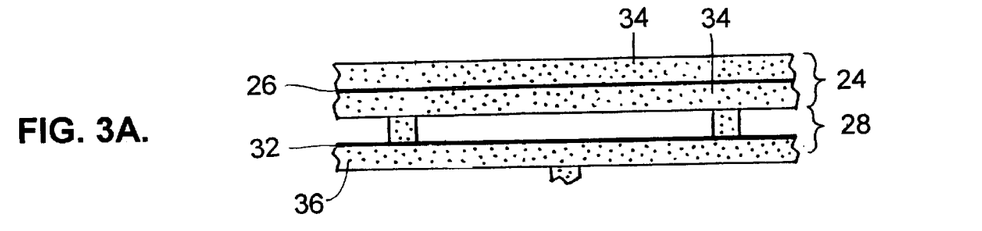
Figure 3B:
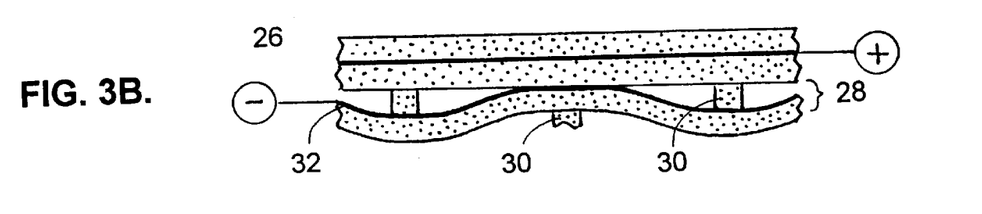

A cross-section of this elementary force cell of the SWT is shown in more detail in FIG. 3 (a–b) with two polyimide layers 34 having a metal 26 sandwiched therebetween, beneath which are a patterned polyimide layer 36 forming the treads, with another metal layer 32 within the partial polyimide layer 36, together forming the flexible layer 28. The SWT is shown in a relaxed (FIG. 3a) and a compressed (FIG. 3b) position. A working transducer of this embodiment of the invention, for example, may have 1 $\mu$m thick polyimide layers, with about 55 pm between treads 30. A typical metal thickness is about 0.2 $\mu$m. Using a transducer having these dimensions, the force between the plates may be calculated as the negative gradient of the capacitive potential energy of the series combination of the air gap and the polyimide support (relative dielectric constant =3). At an actuating voltage of 60 volts the force per $cm^2$ of plate area is 0.2 lb. in the relaxed position and 3.2 lb. in the compression position.

Spiral wound transducers consume electrical power only when they are moving. As the plates close, the capacitance is increased, and in order to maintain constant voltage, the power source must supply current. When the structure is fully compressed, the current flow and power consumption are zero. If the geometry of the cells is such that the structure is very compliant, application of voltage causes complete compression. Once the voltage has produced some compression, the plate separation is reduced and the attractive force is increased. This causes more compression and still greater force until the plates are fully closed. However, if the structure is more resilient, the inherent spring force acts against the capacitive force. This results in a stable equilibrium position that is continuously variable as a function of the applied voltage. The stiffer structure corresponds to a device whose state of compression is controllable. If the external load which is driven by the array has spring-like properties, even a compliant structure will operate in a continuously variable mode. Because the capacitance of the array is directly related to its extent of deformation, both sensing and actuation may be accomplished simultaneously. For example, a high frequency signal may be added to the lower frequency actuation signal and the attenuation of the high frequency signal then used to measure the capacitance and extension of the force array device. In a similar way, useful electrical power may be generated by charging the array at low voltage while it is compressed and then discharging it at much higher voltage after mechanical energy has been used to expand it.

In one embodiment of the invention, spiral wound transducers are fabricated using methods derived from microelectronics production. The microelectronics fabrication methods were used in order to rapidly build a working prototype using methods known in the art. A limitation of SWT's made by this method is that since the tapes are formed on a silicon wafer, so their length is very limited and only small SWT devices can be produced (e.g., to fit on a 100 mm diameter wafer). The microimprinted flexible layer 28 and the stiff layer 24 are formed as strips, for example, 2 mm wide ×60 mm long over a lift-off layer (silicon oxide) on a silicon wafer. Alternatively, the width could go to 60 mm and still fit on the wafer. After fabrication, a pair of tapes (strips) is wound on a 0.4×0.16 mm cross-section conductive central form 70 (preferably collapsed hypodermic tubing, initially 0.013 inches outer diameter and 0.007 inch inner diameter. Forty turns are required for this length of tape. Alternatively, other specially shaped plastic or ceramic could be used for the central form.

The preferred schematic process sequence for forming the tapes strips is shown in FIG. 4, all of which steps are well-known in the area of VLSI processing. In this procedure, the flexible microimprinted tape and the stiff tape are formed on the same substrate using the same process. In areas where the stiff tape are formed, there is no initial oxide etch, and second level polyimide etch mask covers essentially all of the tape. The minimum feature sizes is 5 $\mu$m and the alignment tolerance is +10 $\mu$m. These dimensions are very large compared to those required for the IFA, which allows the spiral wound transducer to be produced more easily than IFAs.

Figures 4A, 4B, 4C, 4D:
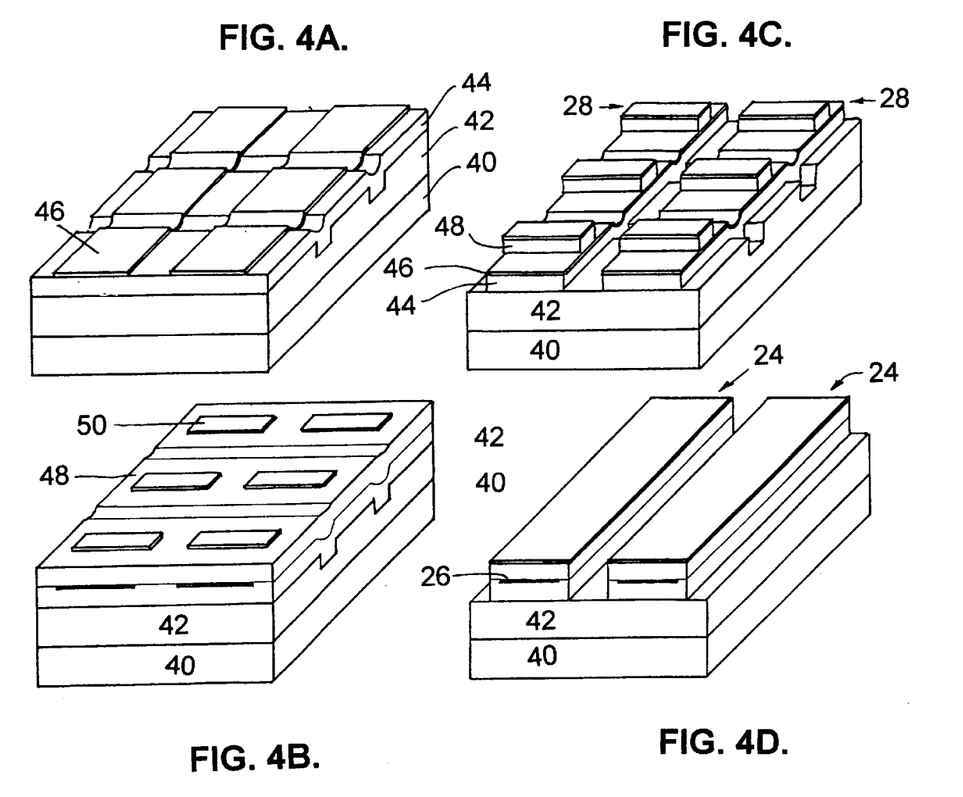
FIG. 4a shows formation of oxide, polyimide and metal layers on a silicon wafer.
FIG. 4b shows addition of a second polyimide layer and application of a hard mask.
FIG. 4c shows definition of the tape with a oxygen plasma etch.
FIG. 4d illustrates the stiff tapes on the same substrate at the same stage in processing as the microimprinted tapes in FIG. 4c.

The VLSI process for forming microimprinted tapes on a silicon wafer is shown in FIG. 4 (a–c). FIG. 4a shows that silicon oxide is grown and etched in diluted aqueous hydrogen fluoride (a standard dilution is 10:1 in water). A first layer of polyimide 44 is coated on the silicon oxide 42, and metal 46 (2000 Angstroms gold over a 200 Angstrom chromium adhesion layer) is evaporated and patterned on the polyimide layer 44. FIG. 4b shows addition of a second polyimide layer 48 and application of a hard mask 50 (e.g., evaporated silicon dioxide) is applied and patterned using plasma etching in tetrafluoromethane gas using standard techniques. In FIG. 4c the microimprinted tape is etched using an oxygen plasma, again with known techniques. FIG. 4d illustrates the stiff tapes 24 on the same substrate at the same stage in processing as the microimprinted tapes 28 in FIG. 4c. After processing on the wafer is complete, all of the tapes are lifted off the substrate by dissolving the silicon dioxide in undiluted aqueous hydrogen fluoride (HF). The tapes are removed from the acid and cleaned in deionized water. A satisfactory method of manipulating the tapes in the liquid media is by means of an artist's fan brush.

Figure 5:
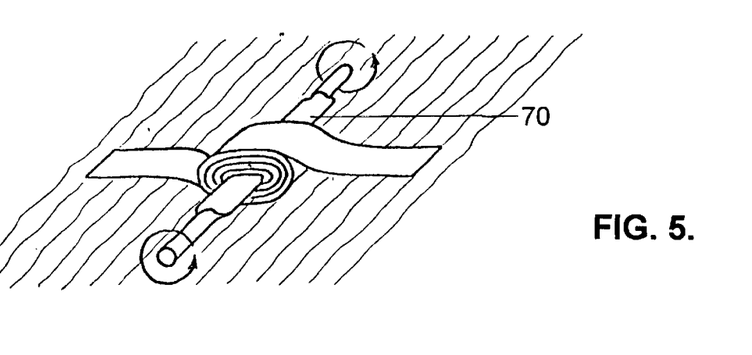
FIG. 5 shows a perspective view of the winding of the SWT.

A number of different specialized fixture may be used to wind the SWTs. As in an earlier construction of a prototype, the tapes are most conveniently floated on the surface of a liquid, such as deionized water during the winding process, as shown in FIG. 5. One end of each of the two tapes is epoxy-glued to the winding form. The other end of each tape is attached to fibers (not shown) which pass over pulleys at opposite ends of the apparatus and which may be variably tensioned with hanging weights. Once the VSLI part of construction has been completed, the wafer contains both the microimprinted tapes and the stiff tapes.

In this embodiment of the invention, once a completed SWT is attached to a winding form 70 and held in a test fixture, the two tapes are separately glued to either side of a small card and a combination of bonding wire (0.003" diameter gold), and conductive epoxy are used to electrically connect the tapes to solder pads on a circuit board. A typical width for the wound tape in this embodiment is about 2 mm. A SWT prototype has at this point showed large amplitude rapid motion when connected to a variable DC power supply (0 to 72 volts).

Figure 6A:
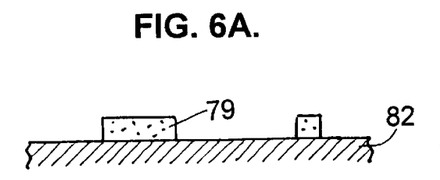
Figure 6B:
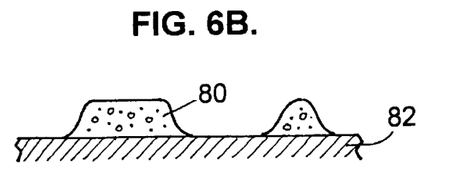

It may be advantageous to bind the entire wound structure shown in FIG. 2 to itself in order to form a single inseparable unit. One way of doing this is involves the use of a patternable microadhesive. The adhesive is essentially a positive working diazoquinone novolak (DQN) photoresist which is applied and patterned in the conventional way and then exposed to a gas phase treatment which plasticizes the resists. The basic process is illustrated in FIG. 6. The patterned DQN resist 79 on a substrate 82 such as silicon (or an oxide of silicon, plastic or metal) is shown in FIG. 6a. FIG. 6b shows the resulting patterned resist after flood exposure with UV light (typically for 3 minutes for a dose of 100 mJ/cm$^2$) and treated with plasticizer, after which some swelling and reflow occur. Preferably the plasticizer is a fairly aggressive monofimetional silylating agent such as trimethylsilyldiethylamine (TMSDEA) which diffuses into the resist film and reacts at all the —OH sites. The —OH is replaced with a trimethylsilyl group which prevents any crosslinking at the site. The silylation with TMSDEA is typically 10 minutes at 105° C. Any substance with a silylating group on it could be used. A silylated resist has not previously been used as a glue.

Figure 6C:
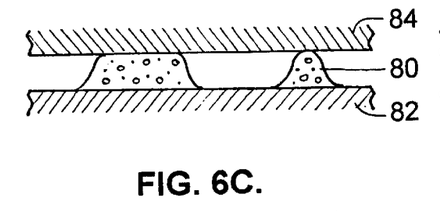
Figure 6D:
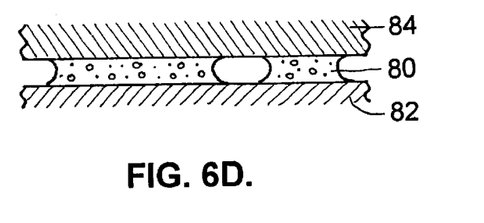

FIG. 6c shows a second substrate 84, which may be the same as or different from the first substrate, placed in contact with the first substrate. Finally, in FIG. 6d, the assembly is heated and joining occurs. The adhesive is 'set' by cooling the assembly If parts upon which the adhesive has been patterned are placed in contact and the temperature is raised to 130° C., the silylated resist 80 smoothly liquefies and does not crosslink to itself in an uncontrolled way. This liquefied resist can act as an adhesive, which "sets" as the temperature is lowered below 130 degrees C.

Figure 7A:
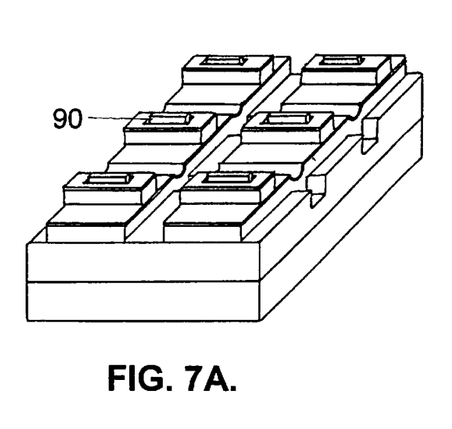
Figure 7B:
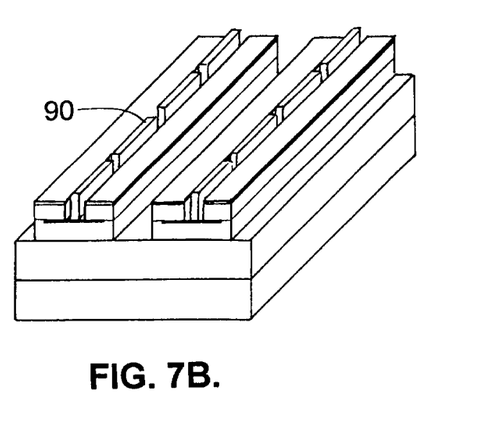

The hard mask shown in FIG. 4 may be modified to accommodate the patterned adhesive layer 90 as shown in FIG. 7 (a–b). Comparison of FIGS. 7a and 7b with FIGS. 4c and 4d, respectively, shows that the patterned adhesive projects slightly above the rest of the structure so that when the tapes are wound, the adhesive is the area which is contacted by adjacent wraps of the winding. After winding, the temperature may be raised to 130° C. and then lowered so as to permanently join the tapes.

Figure 8:
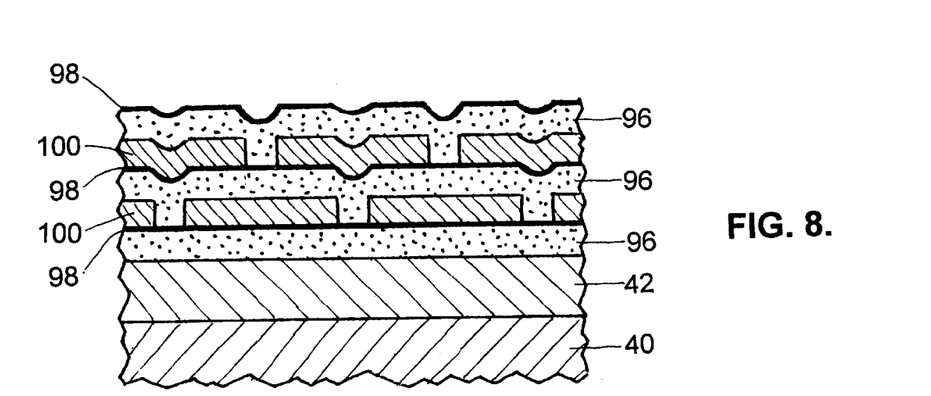
FIG. 8 is a cross-section of a single tape SWT which contains both stiff and microimprinted layers. Evaporated oxide is shown by diagonal closely-spaced lines, polyimide is shown by dots, and the thin metal (2200 Angstroms) is shown by a thick solid line above polyimide layers.

Another way of binding the structure into a single inseparable unit makes use of a single complex tape which contains both the stiff and microimprinted structures. Once the tape is fabricated as a flat structure, the single tape version may be wound by simply applying a non-patterned adhesive layer between the windings. This method is advantageous in that the adhesive does not require patterning and many suitable materials already are commercially available (e.g., cyanoacrylates and epoxies). FIG. 8 shows a cross-section of a single-tape SWT, including the silicon substrate 40, the silicon oxide 42, the polyimide layers 96, the thin metal 98 and the evaporated oxide 100. During liftoff of the structure from the substrate (by dissolving an oxide layer 42 in aqueous HF) shown in FIG. 8, the patterned oxide 100 is also dissolved. The resulting two-course structure may be wound as before with a thin glue layer 91 being applied continuously during winding.

Figures 9A, 9B:
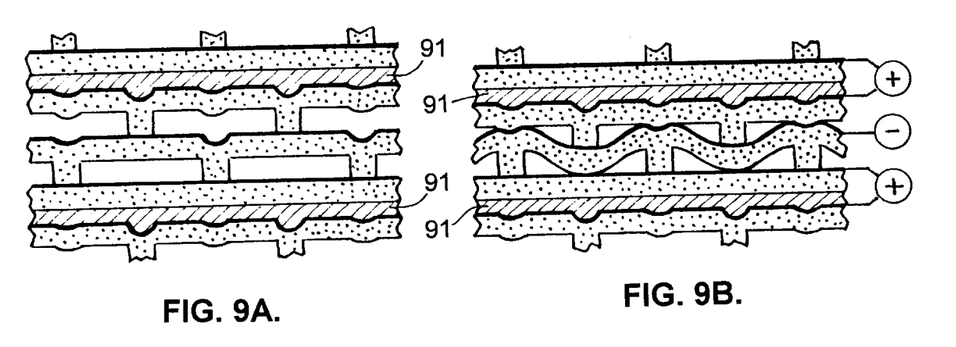

A portion of the cross-section of the assembled single-tape SWT is shown in FIG. 9, which shows both the relaxed (unpowered) and compressed (powered) conditions and the adhesive layer. The charge indications in FIG. 9b refer to poles of an electrical supply (which is not shown).

The manufacture of SWTs may be scaled up directly from the single-tape SWT shown in FIGS. 8–9. A preferred method includes use of commercially available MYLAR™ films and a micro-embossing technique. MYLAR™ films have been made available for use as a dielectric material in capacitors, either metallized or unmetallized in thickness as low as 3 gauge. (or 0.00003 inch). Capacitor grade MYLAR™ films are pinhole free, and very inexpensive and available in continuous rolls with widths up to 62 inches.

Conventional powder embossing is done as follows: 1) a pattern is printed using a slow-drying ink; 2) and embossing powder (an inert resin which may be colored) is sprinkled over the printed page; 3) the powder is blown off the page except in the inked areas, where it adheres by surface tension to the ink; and 4) the temperature is raised until the embossing powder melts over the inked areas and the ink volatizes away. In the scaled-up embossing of SWTs, a finely ground embossing powder which together with metallized MYLAR™ tape on which rows of dots have been printed are used as shown in FIG. 10. Commercial computer printers (for example, a Hewlett Packard ink jet printer with a resolution of 300 dots per inch (dpi)) are capable of the required resolution (on one side of the tape). More expensive commercially available units can achieve 1200 dpi which corresponds to a minimum feature of 21 $\mu$m. At this resolution, dots could be printed in rows 21 $\mu$m wide spaced apart 63 $\mu$m. These dimensions are comparable to the VLSI prototype (5 $\mu$m wide lines spaced at 55 $\mu$m). The fact that the edges of the printed pattern would be irregular or even that there might be small gaps in the printed lines has negligible effect on the function of the SWT. To optimize production, a specialized printer may be constructed to be configured to handle unsupported MYLAR™ films and which can print on both sides. Such a specialized printer preferably utilizes two high resolution commercial printers in close juxtaposition to realize registration of the front and back side patterns.

Figure 10A:
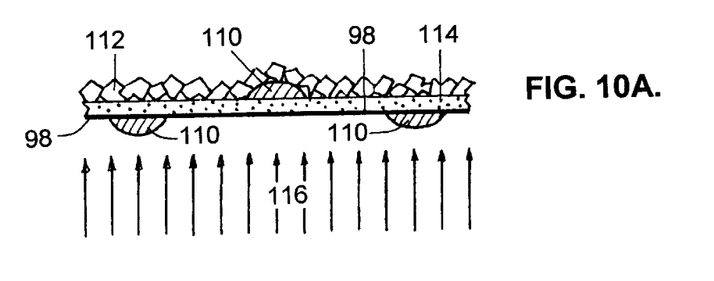
Figure 10B:
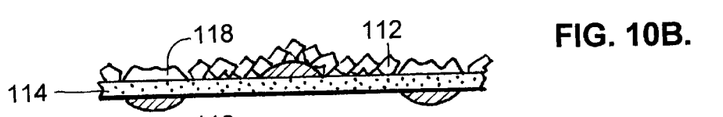
Figure 10C:
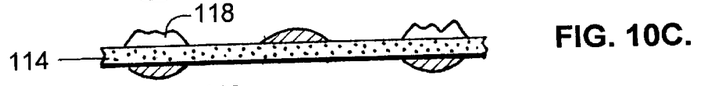
Figure 10D:
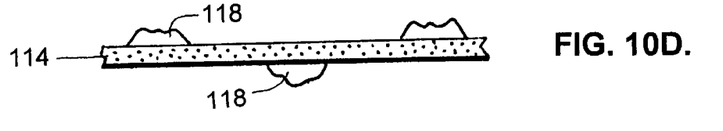
FIG. 10d shows the tape after the same process sequence has occurred on the other side.

In FIG. 10 (a–d) showing the manufacture of microimprinted tape, the FIG. 10a illustrates the metallized microprinted tape with the printed pattern (black ink) 110 on both sides of the film 114 and the (colorless) embossing powder 112 on one side of the film 114. The whole assembly is exposed to infrared or visible radiation 116 as shown. Since the metal 98 is reflective, the only areas that absorb energy are the printed areas on the bottom of the tape. Therefore, the only regions that have powder and become hot are the areas which are opposite the bottom side pattern. FIG. 10b illustrates that the embossing powder is melted in these areas. The powder liquefies at 100° C., well away from the melting point of MYLAR™ polyester (250° C.). In FIG. 10c, the unmelted powder has been removed (either mechanically, by blowing it off, or electrostatically as is known in the art). FIG. 10d shows the tape after the sample process sequence has occurred on the other side. Once again, energy is only absorbed in the IR/visible-exposed ink (the MYLAR™ and melted powder are transparent and the metal is reflective).

Although other methods that may be used for embossing the tape, such as is scanning focused lasers to melt the powdered resin or form dimples in a MYLAR™ tape, the method just described is preferred since it uses available highly developed commercial equipment, and separates the printing process from the embossing process. Embossing is likely to involve powder or some other material which would be incompatible with a high resolution patterning tool.

In scaling up the SWT manufacture, it is not expected that the capacitor gap between the metal films 26 and 32 in FIG. 3a would be significantly increased as this would proportionally increase the required operating voltage. This gap does not increase with increased tape length or width. Thus, the preferred scaled-up SWTs are composed of much wider tapes for easy of manufacture (which are also much longer, for example, 1 inch wide ×200 inches long, with many more turns), but which are composed of tapes as thin as the SWTs discussed above made with microelectronic methods.

Figure 11:
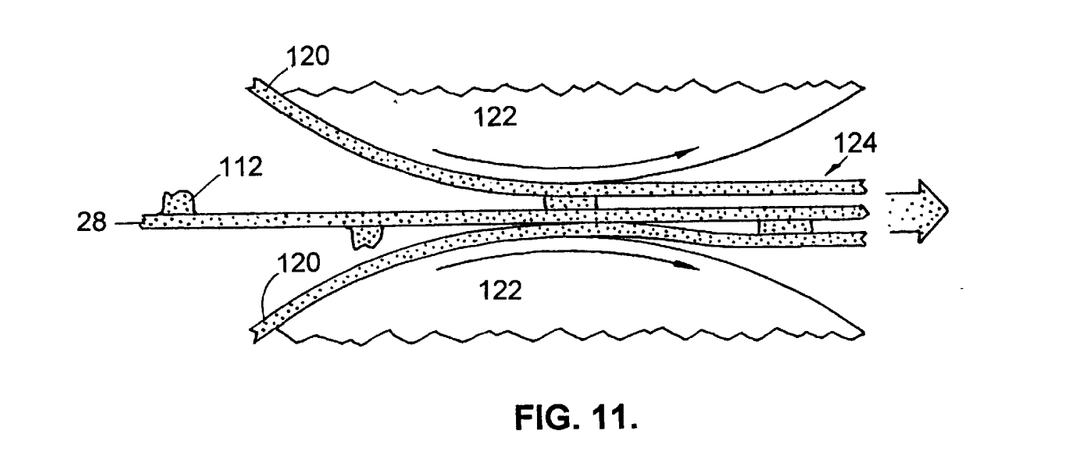
FIG. 11 is a cross section showing production of mnicroimprinted tape between two metallized tapes.

After manufacture of the microprinted tape, the next step in assembly of the SWT is to construct a composite tape similar to the one shown in FIG. 9. A preferred method of doing this is illustrated in FIG. 11. The microimprinted tape is sandwiched between two metallized tapes 120 (which together are effectively like tape 24 when overlapped and glued) by reheating the embossing powder 112 as the three tapes pass through a precision gap between two rollers 122, for example, highly precise cylindrical gauge blocks with a diameter of about 0.2 inch. The composite tape 124 may then be wound, with an adhesive intermediate, to form a SWT similar in cross-section to the device shown in FIG. 9.

The SWT of the invention may be used as transducers in most areas that currently employ electromagnetic solenoids. But, because of their muscle-like properties, the SWT of the invention enables new applications in areas such as haptic systems (programmed "touching" devices like gloves with SWT's incorporated to aid or teach the wearer, for example to improve golf swing, piano playing, etc.) and active prostheses. Another use of the invention is as an actuator in the scanning ultrasound imager, where it serves as a driver to mechanically scan ultrasound transducers.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A transducer compressible in a portion of the transducer in response to electric power, comprising:
    (a) a flexible, conductive plastic layer microimprinted with a tread-like pattern; and
    (b) a stiff plastic layer containing a conductive embedded sheet, wherein the flexible layer and the stiff layer are formed by multiply winding together around a central form, so that the microimprinted flexible layer is bounded by stiff layers,
wherein compression of the transducer in the compressed portion of the transducer is perpendicular to the plane of the conductive embedded sheet and to the linear axis of the central form, and wherein the flexible layer is distorted during compression of the transducer while the stiff layer remains parallel to the surface of the central form in the compressed portion of the transducer.

2. The transducer of claim 1, wherein the flexible layer comprises metallized polyimide.

3. The transducer of claim 1, wherein the flexible layer is conductive due to being made of a conductive plastic material.

4. The transducer of claim 1, wherein the flexible layer is conductive due to a thin metal coating.

5. The transducer of claim 1, wherein the conductive embedded sheet comprises a thin metal film.

6. The transducer of claim 5, wherein the thin metal film is 200 Angstroms chromium and 2000 Angstroms gold.

7. The transducer of claim 1, wherein the layers are in the form of strips formed on a substrate suitable for microelectronic processing.

8. The transducer of claim 7, wherein the substrate is a silicon wafer.

9. The transducer of claim 1, wherein the layers comprise silicon oxide on a silicon wafer, over which a first polyimide layer has been coated and cured and a metal has been evaporated and patterned, and a second polyimide layer has been coated and cured and a hard mask applied and patterned.

10. The transducer of claim 9, further comprising performing an oxygen plasma etch.

11. A transducer compressible in a portion of the transducer in response to electric power, comprising:
    (a) a flexible, conductive plastic layer; and
    (b) a stiff plastic layer containing a conductive embedded sheet, wherein the flexible layer and the stiff layer are composed as a single inseparable unit, and then formed by multiply winding together around a central form and bonding each turn of the winding to adjacent turns by application of an adhesive in the compressed portion of the transducer, wherein compression of the transducer in the compressed portion is perpendicular to the plane of the conductive embedded sheet and to the linear axis of the central form, and wherein compression of an area of the transducer results in distortion of the flexible layer while the stiff layer remains parallel to the surface of the central form in the compressed portion of the transducer.

12. The transducer of claim 11, wherein the transducer comprises two stiff layers with the flexible layer being between the two stiff layers.

13. The transducer of claim 11, wherein the layers are bound into the single inseparable unit before winding by use of a patternable microadhesive.

14. The transducer of claim 13, wherein the microadhesive comprises a diazoquinone novolak photoresist that has been applied to a layer, following by patterning, exposure with UV light, treatment with a plasticizer, and contact with a second layer, heating and joining to the second layer.

15. The transducer of claim 11, wherein the layers are bound into a single inseparable unit by reheating an embossing powder.

16. The transducer of claim 11, wherein the layers are bound into a single inseparable unit by fabricating the stiff and microimprinted layers directly.

* * * * *